(12) United States Patent
Hosking (10) Patent No.: US 8,184,970 B2
(45) Date of Patent: May 22, 2012

(54) OPTICAL TRANSCEIVER WITH LED LINK INFORMATION INDICATOR

(75) Inventor: Lucy G. Hosking, Santa Cruz, CA (US)

(73) Assignee: Finisar Corporation, Sunnyvale, CA (US)

( * ) Notice: Subject to any disclaimer, the term of this patent is extended or adjusted under 35 U.S.C. 154(b) by 687 days.

(21) Appl. No.: 12/184,042

(22) Filed: Jul. 31, 2008

(65) Prior Publication Data

US 2010/0027991 A1 Feb. 4, 2010

(51) Int. Cl.
*H04B 10/00* (2006.01)
(52) U.S. Cl. .......... 398/9; 398/16; 398/22; 398/139
(58) Field of Classification Search .......... 398/135–139, 398/9, 22; 385/88–94
See application file for complete search history.

(56) References Cited

U.S. PATENT DOCUMENTS

| | | | | |
|---|---|---|---|---|
| 5,812,572 A | * | 9/1998 | King et al. | 372/38.04 |
| 6,975,395 B1 | * | 12/2005 | Gentieu et al. | 356/326 |
| 7,426,348 B2 | * | 9/2008 | Mahowald et al. | 398/135 |
| 7,721,012 B2 | * | 5/2010 | Le et al. | 710/8 |
| 7,757,936 B2 | * | 7/2010 | Aguren et al. | 235/375 |
| 2003/0231839 A1 | * | 12/2003 | Chen et al. | 385/78 |
| 2006/0062116 A1 | * | 3/2006 | Ishibashi | 369/47.35 |
| 2006/0189220 A1 | * | 8/2006 | Duval et al. | 439/760 |
| 2007/0092257 A1 | * | 4/2007 | Smith et al. | 398/135 |

* cited by examiner

*Primary Examiner* — Agustin Bello
(74) *Attorney, Agent, or Firm* — Maschoff Gilmore & Israelsen (57) ABSTRACT

Exemplary embodiments of the invention relate to an analyzer device configured to interface with an optical transceiver module having a diagnostic communications port, wherein the port is configured to access diagnostic and other data contained within the transceiver controller via a backdoor interface. Controller data, including operational parameter values and module setup values, is accessible while the transceiver operates in conjunction with an external host and may be retrieved, and sometimes modified, in real time without interrupting normal transceiver operation or suspending the transmission of data over optical fibers. The analyzer device accesses the data via the diagnostic communications port on the outside of the transceiver module.

20 Claims, 8 Drawing Sheets

OPTICAL TRANSCEIVER WITH LED LINK INFORMATION INDICATOR

BACKGROUND OF THE INVENTION

1. The Field of the Invention

The present invention relates generally to optoelectronic communication devices. More specifically, the present invention relates to an analyzer device configured to interface with an optical transceiver having a diagnostic communication port.

2. The Relevant Technology

Computing and networking technology have transformed our world. As the amount of information communicated over networks has increased, high-speed transmission has become ever more critical. Many high-speed data transmission networks rely on optical transceivers and similar devices for facilitating transmission and reception of digital data embodied in the form of optical signals over optical fibers. Optical networks are thus found in a wide variety of high-speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed there through, the intensity of the emitted light being a function of the current magnitude through the transducer. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include an electro-optic transducer driver (e.g., referred to as a "laser driver" when used to drive a laser signal) configured to control the operation of the optical transmitter in response to various control inputs. The optical transceiver also generally includes an amplifier (e.g., often referred to as a "post-amplifier") configured to perform various operations with respect to certain parameters of a data signal received by the optical receiver. A controller circuit (hereinafter referred to the "controller"), which is the focus here, controls the operation of the laser driver and post amplifier.

In addition to controlling the operation of the laser driver and the post amplifier, the controller may collect and manage diagnostic data. Performance characteristics of an optical transmitter and receiver may vary in response to changes in operational conditions like temperature and voltage. For example, the threshold current and slope efficiency of a laser diode vary with temperature. To ensure the quality and integrity of data transmission, various measurement and compensation circuits may be employed by a transceiver to compensate for these changes. The transceiver controller may evaluate operating conditions, such as, but not limited to, temperature, voltage, and low frequency changes (such as receive power) from the post-amplifier and/or from the laser driver, and then adjust component settings to compensate for any changes. The operating condition parameter values, referred to collectively as "diagnostic data", may also be evaluated by the host computer system which typically has access to the controller via a serial interface.

In addition to, and sometimes in conjunction with managing diagnostic data, a controller may also drive several other transceiver functions, including, but not limited to, the following: (i) setup functions which generally relate to the required adjustments made on a part-to-part basis in the factory to allow for variations in component characteristics such as laser diode threshold current; (ii) identification information identifying the transceiver type, capability, serial number, and compatibility with various standards; (iii) eye safety and general fault detection which are used to identify abnormal and potentially unsafe operating parameters and to report these to the user and/or perform laser shutdown, as appropriate; (iv) temperature compensation functions which compensate for known temperature variations in key laser characteristics such as slope efficiency; and (v) monitoring functions that report various parameter values related to the transceiver operating characteristics and environment such as laser bias current, laser output power, received power level, supply voltage and temperature. As such, controller functions and the data contained therein are integral to network performance and, consequently, would be extraordinarily useful to end users such as network administrators if only the data was easily accessible.

Unfortunately, conventional host equipment often lack the ability to access the data. Other host equipment, which may be capable of accessing diagnostic data, typically lacks the means to convey the diagnostic data to an end user in an easy manner. The information can only be obtained through effort that includes additional equipment. It is therefore difficult for network administrators to determine the status of an individual link and to troubleshoot complex systems.

BRIEF SUMMARY OF THE INVENTION

These and other limitations are overcome by embodiments of the invention which relate to an analyzer device for accessing transceiver diagnostic data and interfacing with transceiver control functions while it is operating within a host, allowing: (i) the interrogation and display of the transceiver status in real-time; (ii) the adjustment, tuning and setup of transceiver operational characteristics for specific link conditions; and, (iii) the reprogramming of transceiver operating code Exemplary embodiments of the invention relate to an analyzer device capable of interfacing with an optical transceiver module having a diagnostic communications port, wherein the analyzer device is configured to access diagnostic and other data contained within the transceiver controller. Controller data, including operational parameter values and module setup values, is accessible while the transceiver operates in conjunction with an external host and may be retrieved, and sometimes modified, in real time without interrupting normal transceiver operation or suspending the transmission of data over optical fibers. The data is accessed with an analyzer device via a diagnostic communications port on the outside of the transceiver module.

In evaluating operation conditions, the controller receives analog measurements from several sensors, converts the analog signal to a digital value, performs comparison logic with the digital values and predetermined setup data, and, finally, stores the digital operating condition values and the results of the comparison logic (collectively "digital diagnostic data") in the controller's non-volatile memory. Embodiments of the present invention allow an end user to access to the control module through the diagnostic port of the transceiver. A bidirectional communication link is employed between the analyzer device and the diagnostic port. The analyzer device provides a means to display the data and allows the user to interface with the diagnostic port of the transceiver.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter. Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE SELECTED EMBODIMENTS

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

As mentioned above, in addition to controlling the operation of the laser driver and the post amplifier, the controller collects and manages diagnostic data and other performance data. Further, a controller may also drive several transceiver functions, including setup functions, eye safety and general fault detection, temperature compensation functions, monitoring functions, etc. As such, transceiver controller functions and data are integrally associated with and have significant effects on many aspects of network administration.

Embodiments of the invention provide access to diagnostic data, controller functionality, and other aspects of a transceiver. By making this type of access readily available, controller functions and diagnostic data generated within a transceiver while it is operating within a host system can provide valuable insight into several network administration concerns including transceiver's performance, the integrity of the optical link, the behavior of the optical signal, and the like. Furthermore, with access to the data and functions contained within a transceiver controller while it is operating within the host equipment, an end user could adjust operational parameters and observe the resulting effect on the optical signal in real time.

Transceiver controller functions and data may be integrally associated with and have significant effects on many aspects of network administration. Embodiments of the invention provide means to access transceiver diagnostic data and interface with transceiver control functions while it is operating within a host. This access can allow, by way of example only: (i) interrogation and display of the transceiver status in real-time; (ii) the adjustment, tuning and setup of transceiver operational characteristics for specific link conditions; and, (iii) the reprogramming of transceiver operating code in the field.

Typically, the host computer system is the only available interface between a transceiver module and an end user during operation. Therefore, when a transceiver generates diagnostic data, end user access to that data depends solely on whether the particular host system in which it operates has the ability to access, process, and then display the data in a meaningful way. And since transceiver diagnostic features are a relatively recently developed technology, legacy host equipment often lack the means to access the data. Newer host equipment, which may be capable of accessing diagnostic data, typically lacks the means to display diagnostic data to an end user. It is therefore difficult for network administrators to determine the status of an individual link and to troubleshoot complex systems. While some advanced transceiver configurations may allow an end user with the proper equipment to alter a limited number of setup values, the process required to do so is typically cumbersome, time-consuming, and requires disruption of the optical link. It is either extremely difficult or impossible for an end user to adjust a module's operational parameters to optimize its performance on less than optimal link conditions.

The present invention enables an end user to bypass the difficulties and impediments associated with gaining access to the controller via the host equipment by creating a direct link to the controller via the diagnostic port of the transceiver. The monitoring functions of the controller can be interrogated to gain access to the various operational parameter values, and network problems may be isolated based on those values. Depending on the particular problem, a user may be able to correct it by manipulating the data contained in certain functions of the controller, i.e., a transceiver's operating characteristics may be adjusted to compensate for issues on the network. For example, if a remote transceiver is receiving a weak signal from the local transceiver, an analysis of certain operational parameters may isolate the source of the problem. If it is determined that the weak signal is the result of a distant crimp in the fiber, which would be time-consuming and expensive to fix, a user could manipulate data contained in the local transceiver's controller to increase the laser output power to compensate for the crimp; thereby, restoring the link with minimal downtime and expense.

Additionally, a user may fine-tune certain operational parameters in the controller's setup function to allow the transceiver to operate in conformance with specific link conditions. The ability to fine-tune operational parameters of a transceiver while it is operating within a host allows the end-user to make the proper adjustments quickly and efficiently. The ability to fine-tune parameters is increasingly more useful because, as optics technology advances, high capacity link conditions require increasingly precise parameter values to operate as intended. For example, wavelength-division multiplexing ("WDM"), which multiplexes multiple signals on a single link by using different wavelengths to carry different signals, requires extremely precise laser temperature and frequency controls. Access to the controller setup function enables a user to configure a module's relevant operating characteristics in real-time precisely as required by the particular link on which it is being used.

Moreover, access to the controller permits an end user to reprogram the operating code ("firmware") that drives the transceiver control function and, accordingly, transceiver operation. Generally, due to the manner in which transceivers are used and the nature of firmware, end users cannot alter the operating code that exists in a transceiver when it was purchased. In fact, without controller access, the reprogramming of module firmware rarely takes place outside of a laboratory or production line. Therefore, if a firmware upgrade is required, either to add features or fix a bug in a particular production lot, every unit must be shipped to the manufacturer for reprogramming and then shipped back to the end user. However, recalling a lot of transceivers to reprogram them would typically only be considered as a last resort due to the excessive time and expense involved with the process. In addition, the procedure to have the transceivers reprogrammed involves significant risk to the integrity of module components. Removing the unit from the host, packaging it, shipping it, unpacking it and handling it risks physical damage to sensitive hardware components and circuit exposure to electrostatic discharge ("ESD"). Therefore, the ability to reprogram a transceiver in the field may be quite useful in some circumstances.

Reprogramming a module in the field allows an authorized user to upgrade the version of firmware that a particular transceiver is running, possibly adding new features or increasing functionality. Also, where transceivers were mistakenly introduced into the market with latent defects, certain operational defects may be cured with new firmware. Even defects in transceiver hardware may be compensated for or "patched" by the upgrading the operating code. Access to the controller enables a transceiver to be reprogrammed in the field, thus eliminating the expense and downtime associated with shipping defective units back to the manufacturer for firmware upgrades.

Figure 1:
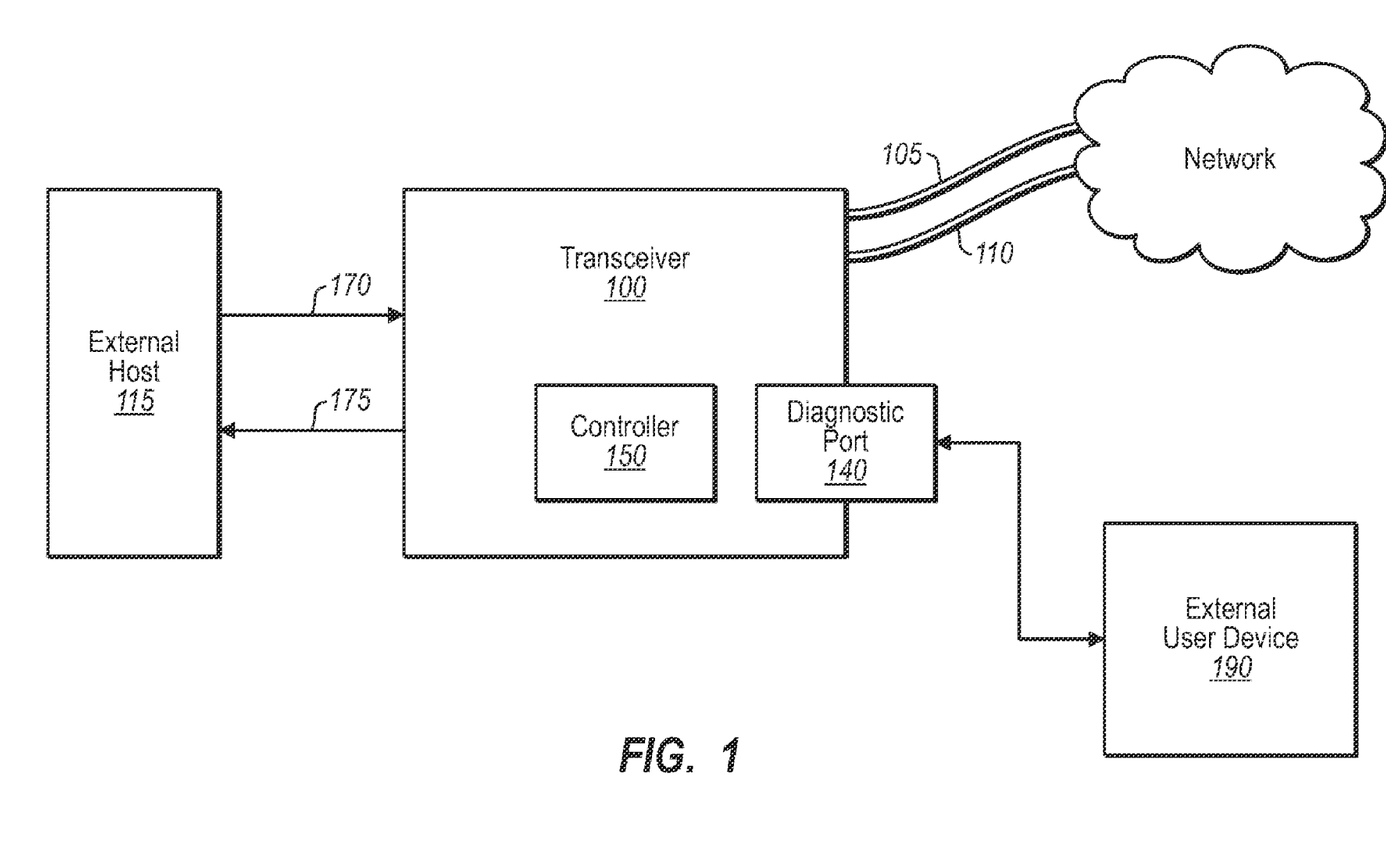
FIG. 1 is a block diagram system overview of the present invention that diagrammatically illustrates the relationship between an analyzer device and a transceiver.

Referring to the system overview illustrated in FIG. 1, exemplary embodiments of the invention relate to an analyzer device 100 capable of interfacing with a transceiver module 190 having a diagnostic communications port 140, wherein the diagnostic communications port 140 is configured to access diagnostic and other data contained within the transceiver controller 150. Controller data, including operational parameter values and module setup values, is accessible by the analyzer device 100 while the transceiver 190 operates in conjunction with an external host 115, as represented by arrows 170 and 175, and may be retrieved, and sometimes modified, in real time without interrupting normal transceiver operation or suspending the transmission of payload data over optical fibers 105 and 110. The analyzer device 100 gains access to the controller data via the diagnostic communications port 140 which is typically located on the face of the transceiver module 190.

An example operational optical transceiver environment, with a focus on controller functionality, will first be described. Then, the operation in accordance with the invention will be described with respect to the operational environment.

While the optical transceiver 190 will be described in some detail, the optical transceiver 190 is described by way of illustration only, and not by way of restricting the scope of the invention. The principles of the present invention are suitable for 1G, 2G, 4G, 8G, 10G and higher bandwidth fiber optic links. Furthermore, the principles of the present invention may be implemented in optical (e.g., laser) transmitter/receivers of any form factor such as XFP, SFP and SFF, without restriction. Having said this, the principles of the present invention are not limited to an optical transceiver environment at all.

Figure 2:
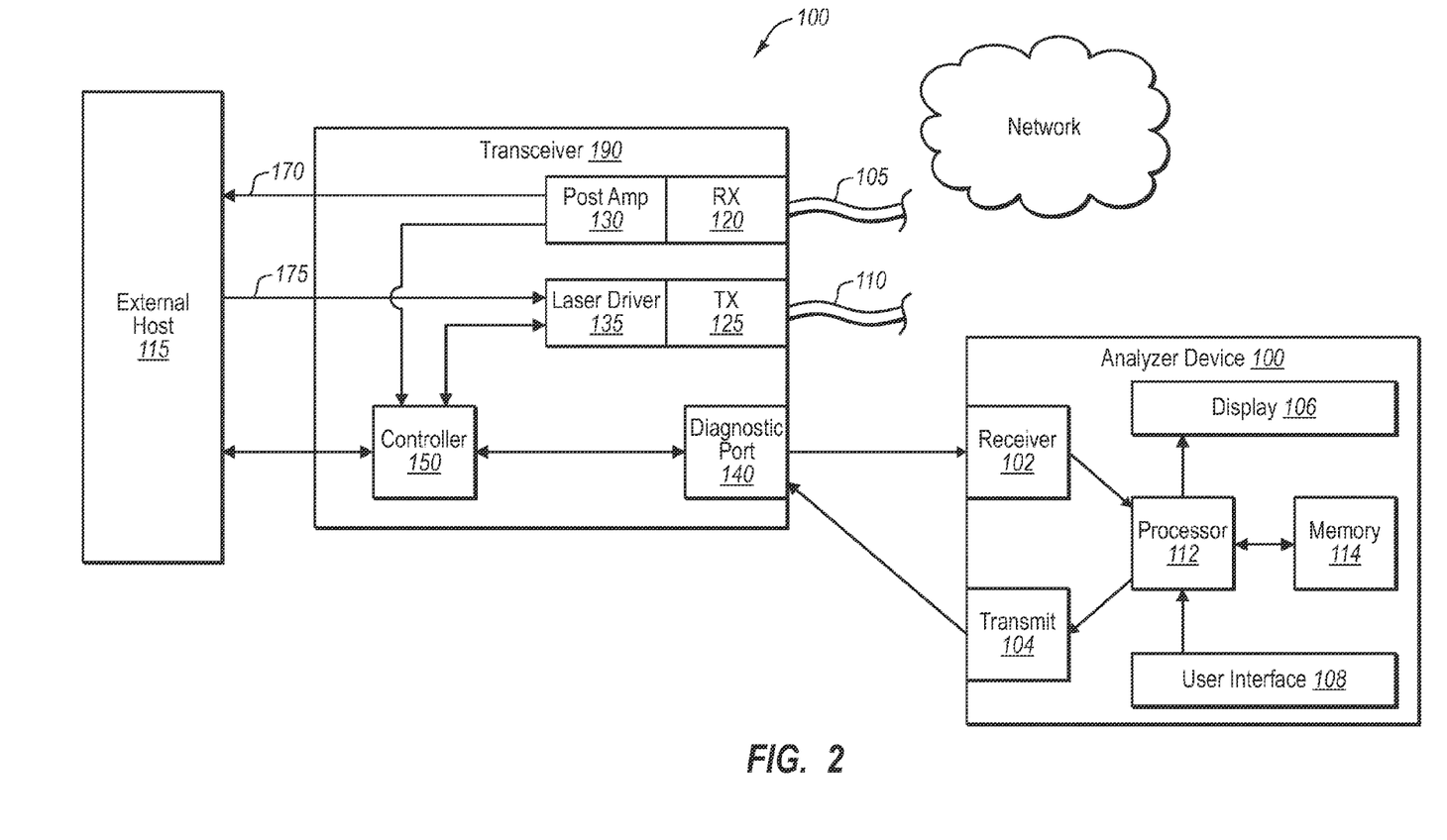
FIG. 2 illustrates the system diagram of FIG. 1 in further detail.

As shown in FIG. 2, the optical transceiver 190 receives an optical signal from fiber 105 using receiver 120. The receiver 120 acts as an opto-electric transducer by transforming the optical signal into an electrical signal. The receiver 120 provides the resulting electrical signal to a post-amplifier 130. The post-amplifier 130 amplifies the signal and provides the amplified signal to an external host computing system represented by arrow 170. The external host 115 may be any computing system capable of communicating with the optical transceiver 190.

The optical transceiver 190 may also receive electrical signals from the host 115 for transmission onto the fiber 110. Specifically, the laser driver 135 receives an electrical signal from host 115 as represented by the arrow 175, and drives the transmitter 125 (e.g., a laser or Light Emitting Diode (LED)) to emit optical signals onto the fiber 110, where optical signals are representative of the information in the electrical signal provided by the host 115. Accordingly, the transmitter 125 serves as an electro-optic transducer.

The behavior of the receiver 120, the post-amplifier 130, the laser driver 135, and the transmitter 125 may vary dynamically due to a number of factors. For example, temperature changes, power fluctuations, and feedback conditions may each affect the performance of these components. To ensure the quality and integrity of data transmission, various measurement and compensation circuits may be employed to compensate for these changes. The measurement and compensation circuits are managed by the control module of the transceiver, hereinafter "controller" 150.

The controller 150 collects and evaluates diagnostic data, such as, but not limited to, temperature, voltage, and low frequency changes (such as receive power) from the post-amplifier 130 (as represented by arrow 180) and/or from the laser driver 135 (as represented by arrow 185). In evaluating operation conditions, the controller 150 receives analog measurements from several sensors, converts the analog signal to a digital value, performs comparison logic with the digital values and predetermined setup data, and, finally, stores the digital operating condition values and the results of the comparison logic (collectively "digital diagnostic data") in the controller's 150 non-volatile memory. This allows the controller 150 to optimize the dynamically varying performance, and additionally detect when there is a loss of signal. Specifically, the controller 150 may counteract these changes by adjusting settings on the post-amplifier 130 and/or the laser driver 135 as also represented by the arrows 180 and 185.

The manner in which the controller manages the transceiver operation is governed by the controller's firmware. The controller's firmware is located in non-volatile memory and typically includes several control functions including, but not limited to the following:

Setup functions. These generally relate to the required adjustments made on a part-to-part basis in the factory to allow for variations in component characteristics such as laser diode threshold current.

Temperature compensation functions. For example, compensating for known temperature variations in key laser characteristics such as slope efficiency.

Monitoring functions. Monitoring various parameters related to the transceiver operating characteristics and environment. Examples of parameters that it would be desirable to monitor include laser bias current, laser output power, received power level, supply voltage and temperature.

Margining. "Margining" is a mechanism that allows the end user to test the transceiver's performance at a known deviation from ideal operating conditions, generally by scaling the control signals used to drive the transceiver's active components.

Figure 3:
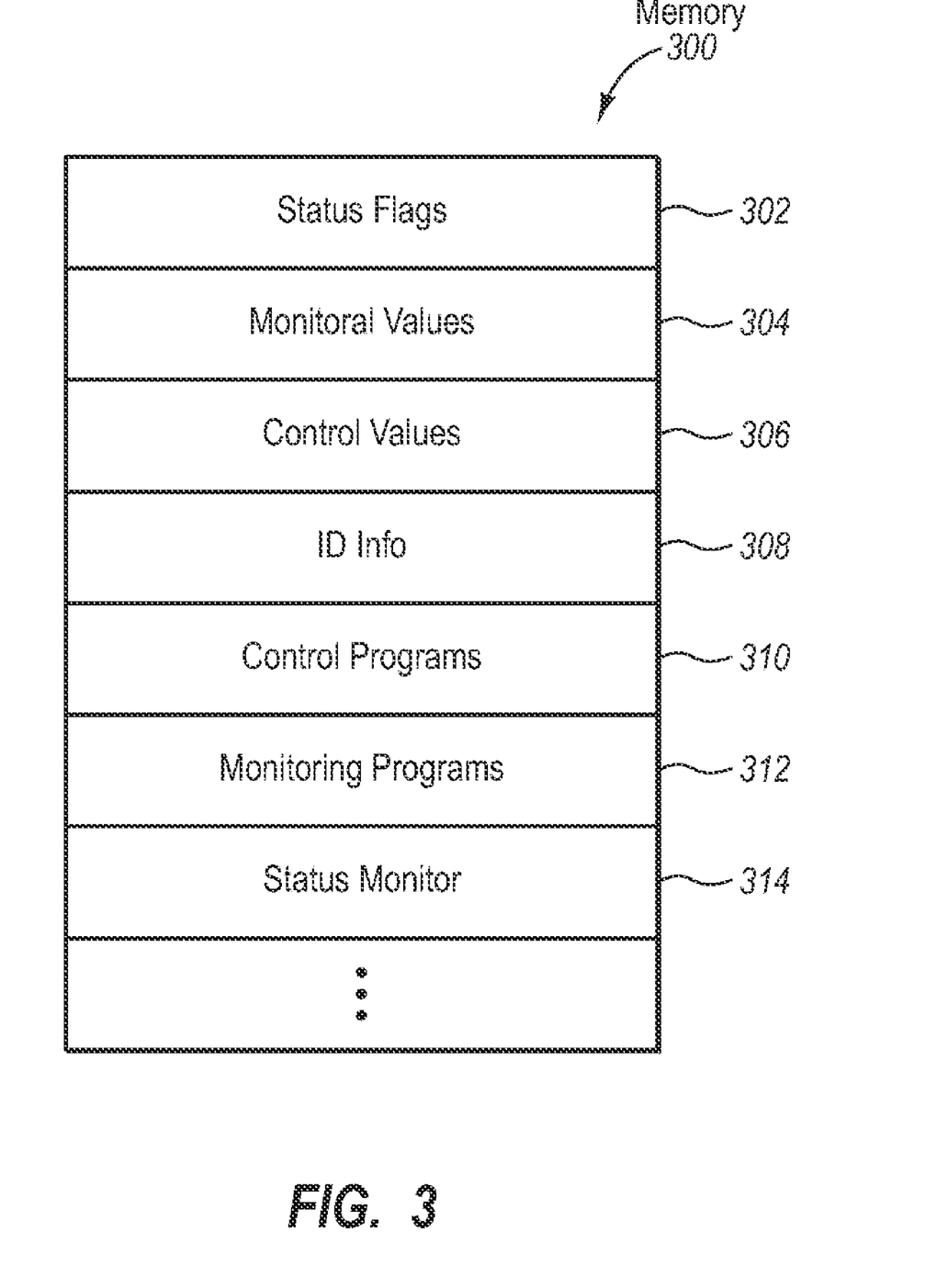
FIG. 3 illustrates an exemplary memory map within the controller of the transceiver module of FIG. 2.

FIG. 3 is a block diagram illustrating an example of a memory map 300 employed by transceiver control functions. Referring to this figure, in some embodiments the memory 300 stores the following programs, modules and data structures, or a subset thereof:

status flags 302;
monitored values 304;
control values 306;
identifying information 308;
control programs 310;
monitoring programs 312; and
status monitor 314.

Status flags 302 may include comparisons of operating conditions with warning alarms. In some embodiments, status flags 302 may include low and high level alarm flags.

Monitored values 304 may include values associated with an operating condition of the transceiver, such as a power supply voltage level, a bias current level, a received optical power level, a transmitter output power level, an internal temperature.

Control values 306 may include values associated with controlling the operation of the fiber optics transceiver.

Identifying information 308 may include information identifying the transceiver, such as the serial number of the transceiver or other types of identifiers.

Controller data and control functions are accessible by the analyzer device 100 during normal transceiver operation via the diagnostic communications port 140 of the transceiver 190. Referring again to FIG. 2, the analyzer device 100 user interface 108 may be any conceivable type of user interface, including, but not limited to, a keyboard, a mouse, a touch screen or any combination thereof. The display 106 of the analyzer device 100 is configured to visually display information to users. The presentation of data on display 106 is controlled by the processor 112. Although the display 106 is illustrated in FIG. 2 as being part of the analyzer device 100, the display 106 may be a separate component from the analyzer device 100. The memory 114 may be used to store data received from the transceiver 190 or data to be sent to the transceiver 190. The receiver 102 accepts incoming signals and, if necessary, configures the incoming signals to conform to a format which can be read by the processor 112. Conversely, the transmitter 104 configures outgoing signals from the processor 112 to a format that can be properly read by the diagnostic communications port 140 of the transceiver module 190.

The format in which signals are transferred between the analyzer device 100 and the diagnostic port 140 of the transceiver 190 depends, in part, on the configuration of the diagnostic port 140 of the transceiver 190. The diagnostic port 140 may be configured to transmit and receive any conceivable type of signal format, including, but not limited to, optical signals, electrical signals, and radio signals.

Figure 4A:
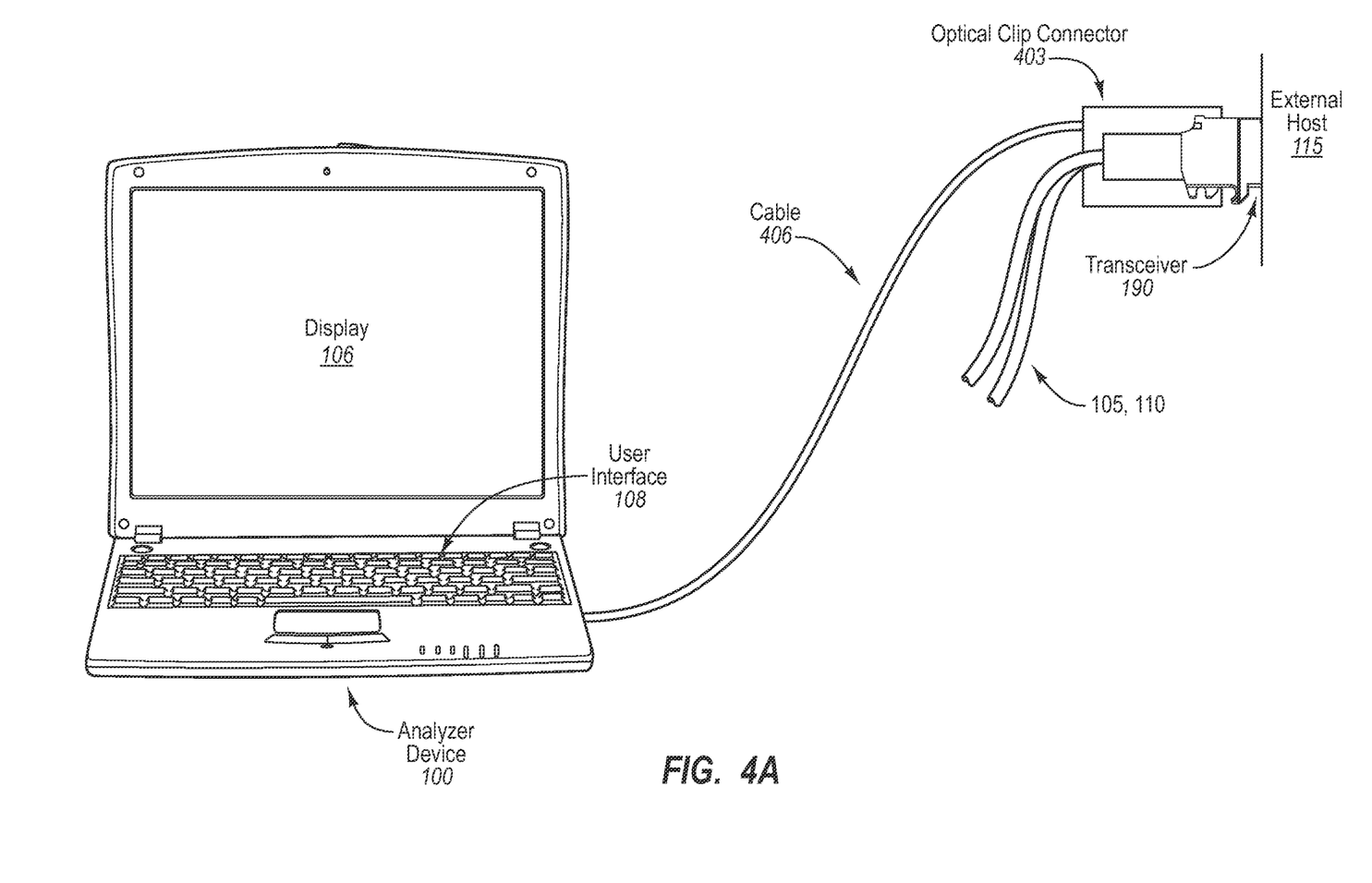
FIG. 4A illustrates an exemplary embodiment of the present invention employing an optical transmission format via an optical clip connector.
Figure 4B:
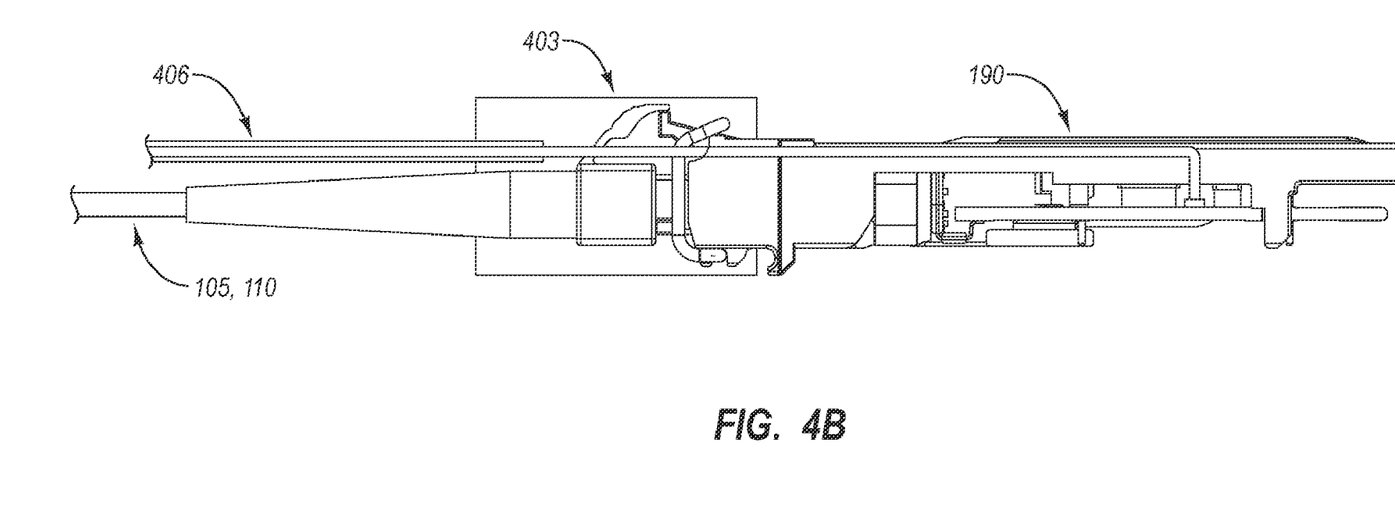
FIG. 4B illustrates a side view of a transceiver module operating within an external host with an optical clip connector attached.
Figure 4C:
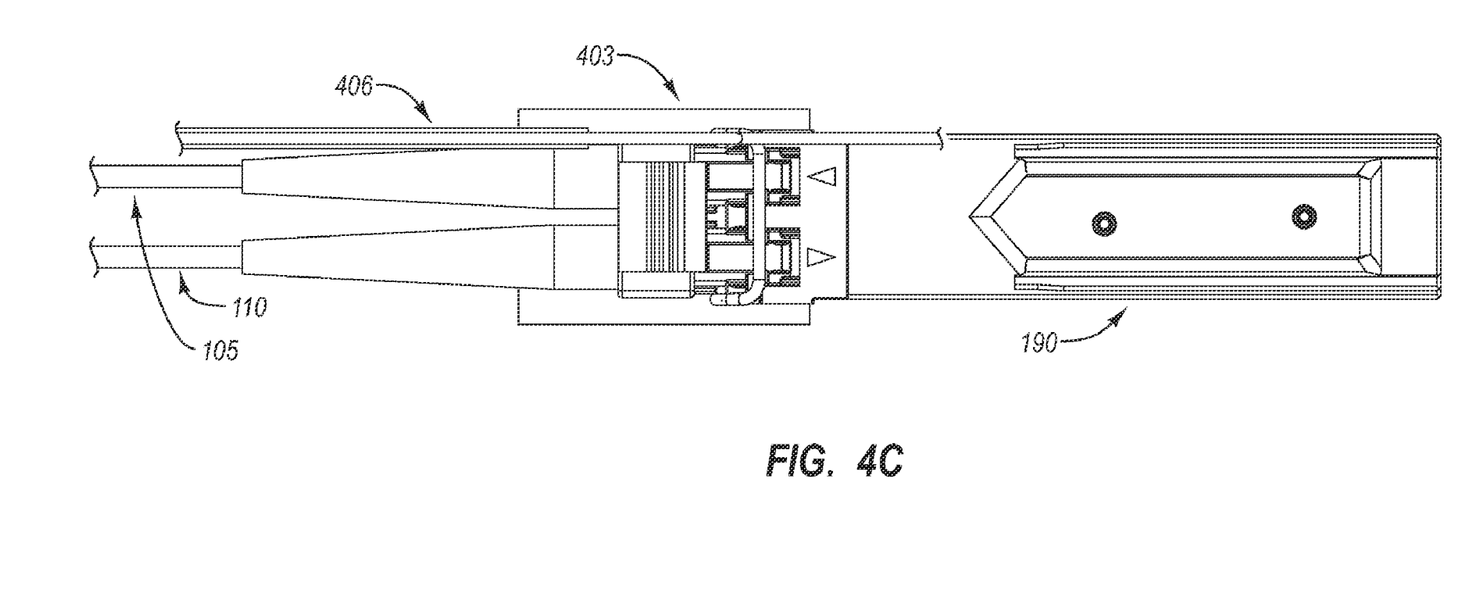
FIG. 4C illustrates a top view of a transceiver module operating within an external host with an optical clip connector attached.
Figure 4D:
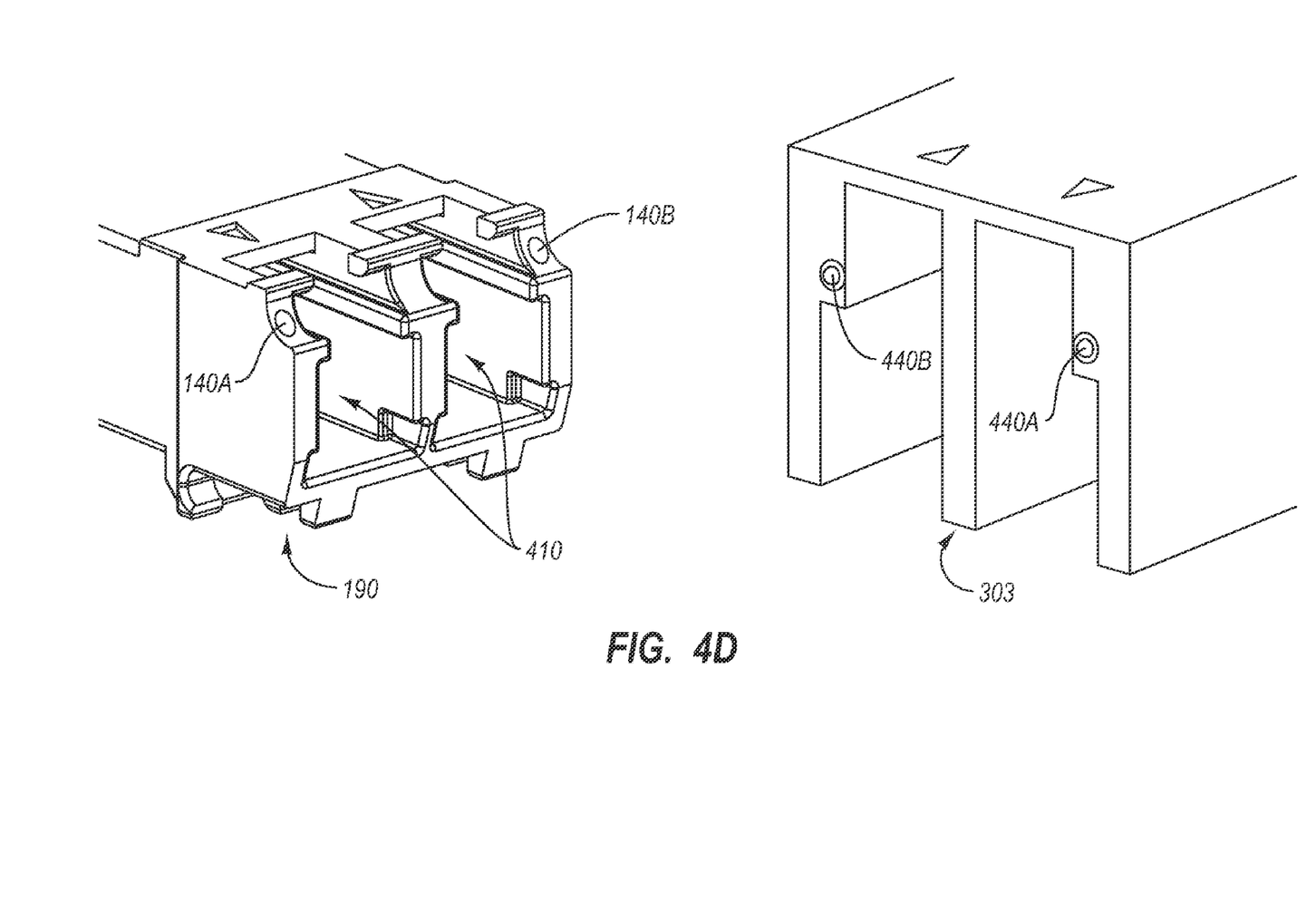
FIG. 4D illustrates an exemplary the face of a transceiver having a diagnostic port and an exemplary face of a optical clip connector.
Figure 4E:
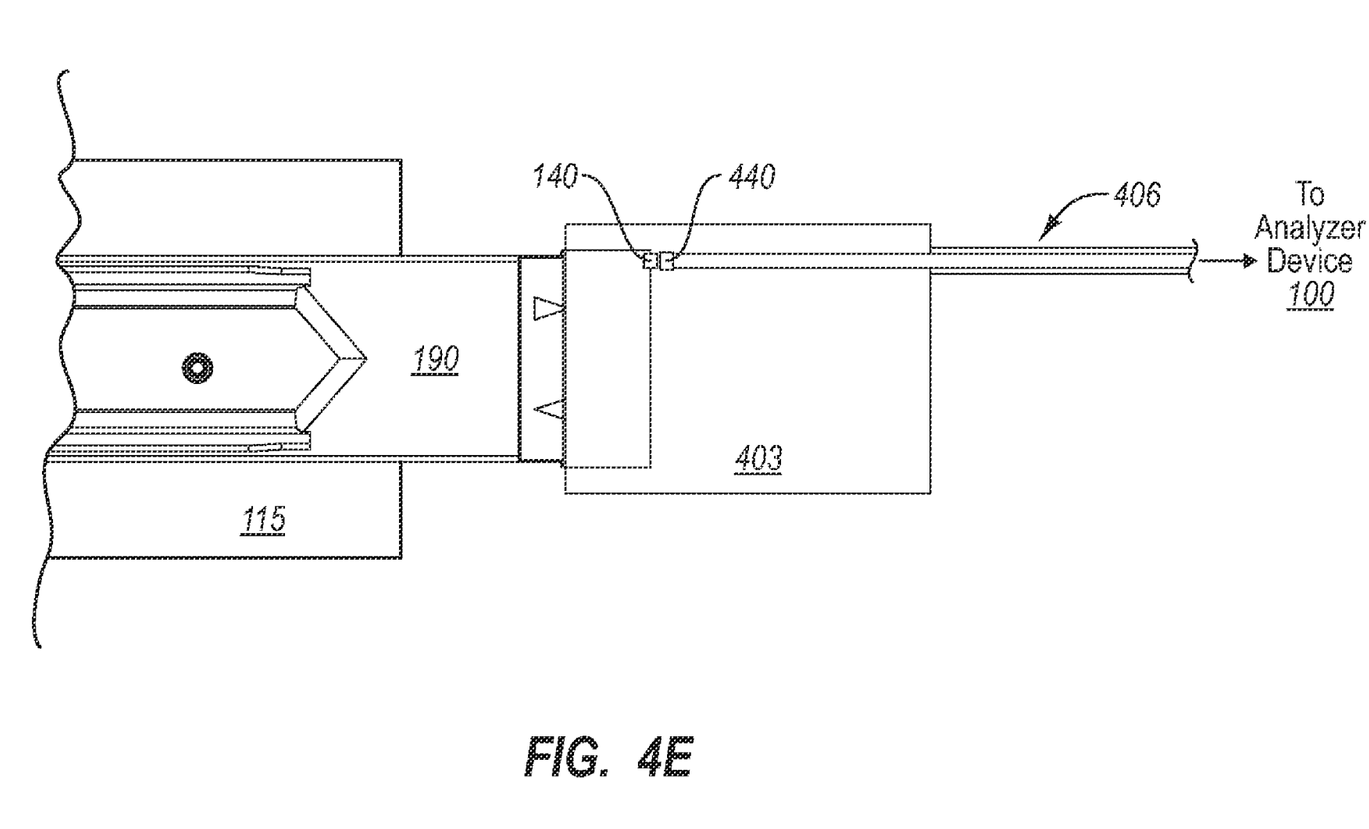
FIG. 4E illustrates the transceiver module operating within an external host with an optical clip connector attached of FIG. 4B in further detail.

FIGS. 4A-4E illustrate an exemplary embodiment of an analyzer device 100 configured to enable communication with a diagnostic port 140 having an optical transmission format. The analyzer device 100 communicates to the diagnostic communication port 140 of the transceiver 190 via the cable 406 and attached clip connector 403. The clip connector 403 fits over the face of the transceiver 190 and engages the diagnostic communication port 140 of the transceiver 190 without disruption of the transfer of data over fibers 105 and 110. As best shown in FIG. 4D, the face of the clip connector 403 contains optical ports 440A and 440B that correspond to diagnostic communication ports 140A and 140B, respectively, on the face of the transceiver 190. When attached to the face of the transceiver 190, the optical ports 440A and 440B of the clip connector 403 align with the diagnostic communication ports 140A and 140B of the transceiver 190 such that optical signals may be properly transferred from one port to the other. In this embodiment, diagnostic communication port 140A of the transceiver 190 and optical port 440A of the connector clip 403 are used to transfer data from the analyzer device 100 to the transceiver 190. An electrical signal generated by the processor 112 of the analyzer device 100 is converted to an optical signal by an electro-optic transducer (not shown) so that it may be output by optical port 440A and received by diagnostic port 140A of the transceiver 190. Conversely, diagnostic communication port 140B of the transceiver 190 and optical port 440B of the connector clip 403 are used to transfer data from the transceiver 190 to the analyzer device 100. The optical signal output by the diagnostic communication port 140B is transmitted to optical port 440B and then converted to an electrical signal by an optoelectric transducer (not shown) so that it may be properly received by the analyzer device 100. The cable 406 may be either optical or electrical. If the cable 406 is electrical, the optoelectric transducer and electro-optic transducer may reside in the clip connector 403, and if the cable 306 is optical, the optoelectric transducer and electro-optic transducer may reside in the analyzer device 100.

Alternative methods may be used to transfer data between the analyzer device 100 and the transceiver 190, including an electrical or wireless transfer. An electrical transfer may involve the use of a connector cable electrically coupled to the analyzer device 100 and the diagnostic communication port 140 of the transceiver 190. A wireless implementation may include an antenna, transmitter and receiver to wirelessly transfer and receive data. The antenna is a transducer designed to transmit and receive electromagnetic waves. In other words, the antenna converts electromagnetic waves into electrical currents and vice versa. The transmitter works in conjunction with the antenna to propagate the electromagnetic signal. The transmitter may include a number of components including a power supply, an oscillator, a modulator, and amplifiers. The modulator is the component which modulates signal information onto the carrier frequency, which is then broadcast. The receiver receives input from the antenna, uses electronic filters to separate the desired radio signal from undesired signals picked up by antenna, amplifies the desired signal to a level suitable for further processing, and finally converts the signal through demodulation and decoding into a form usable by the processor 112. Also, a wireless execution may be implemented such that the analyzer device 100 may interrogate several transceiver modules simultaneously.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An analyzer device for transmitting data to and receiving data from a transceiver module that communicates over a network, the analyzer device comprising:
   a processor;
   a user interface communicatively coupled to the processor, wherein the user interface is configured to translate user input into electrical signals capable of being read by the processor;
   a visual display communicatively coupled to the processor, wherein the visual display is configured to display data received from the transceiver module;
   a cable comprising:
      a first end communicatively coupled to the processor;
      a second end opposite the first end; and
      a clip connector coupled to the second end of the cable, the clip connector comprising:
         an analyzer transmit port configured to align with a diagnostic receive port of the transceiver module to transfer data from the analyzer to the transceiver module; and
         an analyzer receive port configured to align with a diagnostic transmit port of the transceiver module to transfer data from the transceiver module to the analyzer;
         wherein the clip connector is configured to fit over a face of the transceiver module without removing optical fibers that extend from the face of the transceiver module.

2. The analyzer device of claim 1, wherein the cable includes an optical communication assembly, the optical communication assembly comprising:
   an optical transmitter capable of being communicatively coupled to the processor for converting electrical signals from the processor to optical signals, and outputting the optical signals to the diagnostic receive port of the transceiver module through the analyzer transmit port; and
   an optical receiver capable of being communicatively coupled to the processor for receiving optical signals from the diagnostic transmit port of the transceiver module through the analyzer receive port, and converting the optical signals to electrical signals capable of being read by the processor.

3. The analyzer device of claim 2, wherein the optical signals are in the infrared region of the electromagnetic spectrum.

4. The analyzer device of claim 2, wherein the optical signals are in the visible region of the electromagnetic spectrum.

5. The analyzer device of claim 2, wherein the optical communication assembly resides within the first end of the cable.

6. The analyzer device of claim 2, wherein the optical communication assembly resides within the second end of the cable.

7. The analyzer device of claim 1, wherein the data transmitted to and received from the transceiver module includes at least one of user interface data, transceiver digital diagnostic data, transceiver setup functions, transceiver identification information, transceiver eye safety and general fault detection information, transceiver temperature compensation functions, transceiver monitoring functions, transceiver power on time data, and transceiver margining data.

8. The analyzer device of claim 1, wherein the analyzer device is portable.

9. The analyzer device of claim 1, wherein the analyzer device is hand-held.

10. An analyzer device capable of transmitting data to and receiving data from a transceiver module having a diagnostic port, the analyzer device comprising:
    a processor;
    a cable assembly having a clip that attaches with a face of a transceiver installed in a communication network with a first optical fiber coupled into a transmit port of the transceiver and a second optical fiber coupled into a receive port of the transceiver, wherein the clip aligns the cable with a diagnostic receive port and a diagnostic transmit port of the transceiver while the first and second optical fibers remain coupled into the transmit and receive ports of the transceiver;
    a receiver component for receiving signals from the diagnostic transmit port of the transceiver over the cable assembly, wherein the signals received contain information associated with transceiver operation; and
    a transmitter component for sending signals over the cable assembly to the diagnostic receive port of the transceiver, wherein the signals sent contain data to be stored in a predefined memory location in the transceiver.

11. The analyzer device of claim 10, further comprising a user interface.

12. The analyzer device of claim 10, further comprising a visual display.

13. The analyzer device of claim 10, further comprising memory, including one or more memory arrays for storing data.

14. The analyzer device of claim 10, wherein the data transmitted to and received from the diagnostic receive and transmit ports of the transceiver includes at least one of user interface data, transceiver digital diagnostic data, transceiver operating code, transceiver setup functions, transceiver identification information, transceiver eye safety and general fault detection information, transceiver temperature compensation functions, transceiver monitoring functions, transceiver power on time data, and transceiver margining data.

15. The analyzer device of claim 10, wherein the cable assembly further comprises an optoelectrical transducer configured to convert optical signals received from the diagnostic transmit port of the transceiver to electrical signals capable of being received by the processor, and an electro-optic transducer configured to convert electrical signals from the processor to optical signals capable of being received by the diagnostic receive port of the transceiver.

16. The analyzer device of claim 10, wherein the analyzer device is portable.

17. The analyzer device of claim 1, wherein the cable comprises an electrical cable configured to carry data electrically between the first and second ends of the cable.

18. The analyzer device of claim 1, wherein the cable comprises an optical cable configured to carry data optically between the first and second ends of the cable.

19. The analyzer device of claim 1, wherein the data transmitted to the transceiver module includes transceiver operating code for reprogramming existing operating code of the transceiver module.

20. The analyzer device of claim 1, wherein the data transmitted to the transceiver module includes data configured to fine-tune operational parameters in a setup function of a controller of the transceiver module to allow the transceiver module to operate in conformance with specific link conditions.

* * * * *